United States Patent Office 3,532,430
Patented Oct. 6, 1970

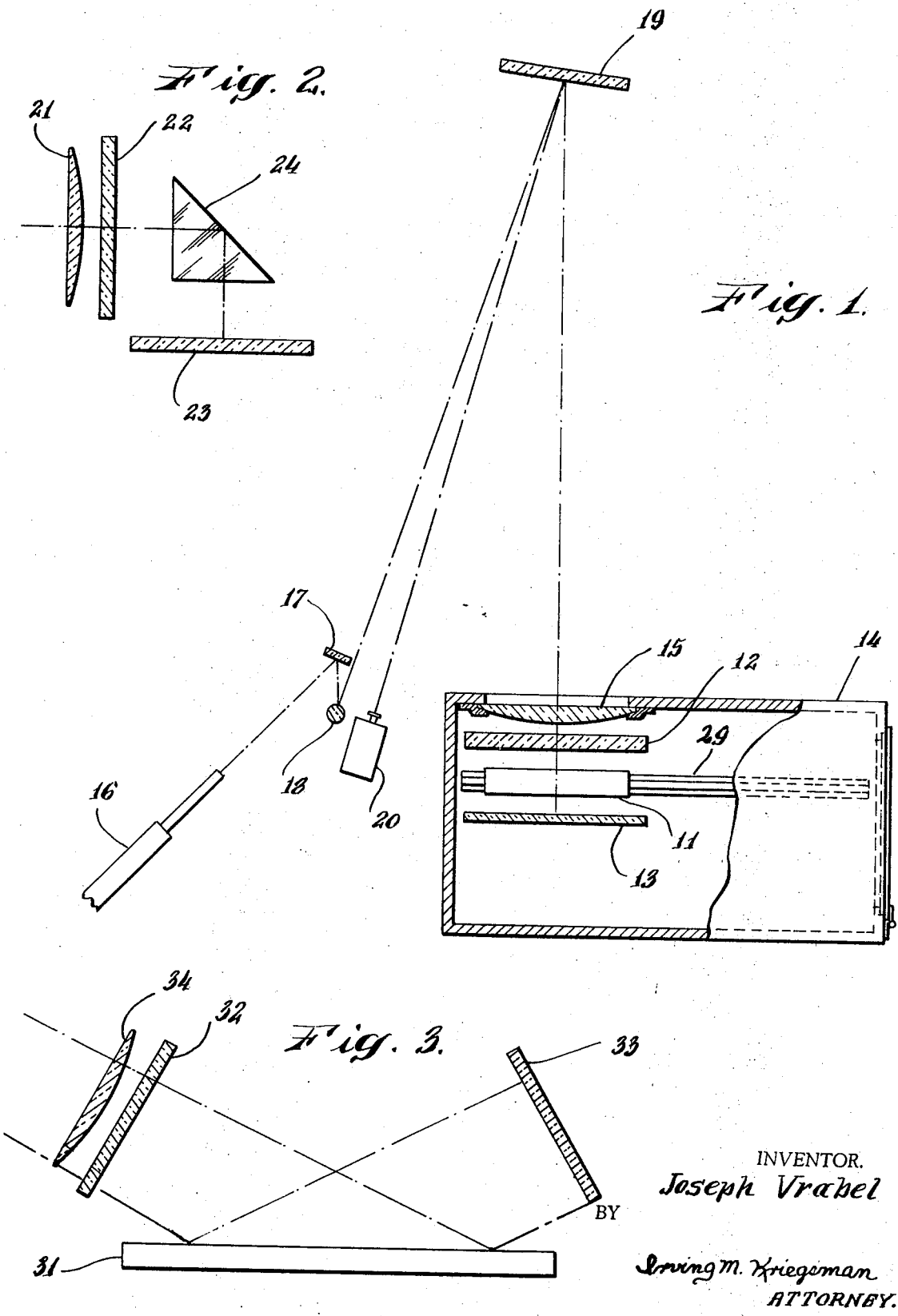

3,532,430
OPTICAL TEST APPARATUS AND METHOD
Joseph Vrabel, Wilton, Conn., assignor to The Perkin-Elmer Corporation, Norwalk, Conn., a corporation of New York
Filed Apr. 12, 1966, Ser. No. 542,054
Int. Cl. G01b 9/02
U.S. Cl. 356—106                                          6 Claims

ABSTRACT OF THE DISCLOSURE

A method and apparatus for testing an optical element by multiple reflection interferometry. A collimated beam of coherent light is directed through a beamsplitting mirror lying in a plane normal to the beam axis and strikes the optical element being tested. Light emerging from the optical element is directed back on axis by a totally reflecting mirror, re-emerges from the optical element and combines with the light initially reflected by the beamsplitting mirror to produce straight line interference fringes.

---

The present invention relates to optical testing. More particularly, the present invention relates to a method and apparatus for testing optical components or systems by multiple reflection interferometry.

The use of interferometers and interferometry techniques for performing various optical tests and measurements is well known in the art. The modified Michelson or the Twyman-Greene interferometer, as it is sometimes called, is one type of interferometer commonly used in testing optical elements. In the modified Michelson or Twyman-Greene interferometer, a beam of light is separated into two parts by means of a tilted beam splitter, reflected off of separate end mirrors and then recombined to form interference fringes. When used to test an optically transmissive component, the component is generally positioned along one of the optical paths. When used to test an optically reflective component, the component is mounted in place of one of the end mirrors. Although interferometers of this type have performed satisfactorily when testing relatively small optical components, (i.e., up to 10 inches in diameter) several critical features are present which seriously affect and limit their feasibility and precision in testing relatively large optical components (i.e., greater than 10 inches in diameter). For example, the tilted beam splitter must be an optically homogeneous material and must be made from a material that will not bend under its own weight. Vibration and thermal problems can arise due to the separation of the beam into two different beams. The requirement that the two optical paths must be equal in length also creates problems. These disadvantages along with others have created the need for a new type of interferometer and method for testing optical components or systems.

It is therefore an object of the present invention to provide a new and improved method and apparatus for testing optical components by means of interference fringes.

It is another object of the present invention to provide a new and improved interferometer for testing optical components or systems which utilizes monochromatic coherent light.

It is still another object of the present invention to provide a new and improved method and apparatus in which optical components and systems can be tested interferometrically using multiple reflections.

It is yet still another object of the present invention to provide a new and improved method and apparatus for use in testing interferometrically optically transmissive and optically reflective components.

Another object of the present invention is to provide a new and improved interferometer for use in testing optical components and systems in which the homogeneous quality of the material parts is not critical and the apparatus is less sensitive to vibration and thermal effects.

Still another object of the present invention is to provide a new and improved interferometer which is easy to fabricate, has relatively few parts and which can be used for testing relatively large optical components or systems to a high degree of precision.

Yet still another object of the present invention is to provide a new and improved interferometer for testing large optical components in which a laser beam is used as a light source for obtaining multiple reflections.

Other objects and many attendant advantages of the present invention will be readily appreciated as the same becomes better understood through reference to the following detailed description when taken in conjunction with the accompanying drawings wherein like reference numerals represent like parts and wherein:

FIG. 1 is a plan view partly in section of one embodiment of the invention,

FIG. 2 is a plan view partly in section of a portion of another embodiment of the invention, FIG. 3 is a plan view partly in section of a portion of still another embodiment of the invention.

According to this invention, the above and other objects are achieved by providing a method and apparatus for testing optical components by multiple reflection interferometry. The apparatus includes a laser light source and produces interference fringes of extremely high quality of fineness. Multiple reflections are obtained by propagating the beam of light from the laser through a partially transmissive mirror at normal incidence and then reflecting the beam of light by means of a suitably positioned totally reflective mirror. The invention can be used for testing optically transmissive and optically reflective components or systems. Included amongst the optically transmissive components that can be tested are plane windows, prisms, lenses and lens systems. Included amongst the optically reflective elements that can be tested by means of this invention are mirrors and other types of reflective surfaces. Relatively large sized optical elements (i.e., greater than 10 inches in diameter) can be tested quite easily and do not because of their size create additional problems or limitations.

Referring now to the drawings, there is shown in FIG. 1 an embodiment of the present invention arranged to test an optical flat or plane window 11.

This embodiment includes a beam splitting mirror 12 and an end mirror 13. Beam splitting mirror 12 and end mirror 13 are spaced apart at any convenient distance and arranged so that they are lying in parallel planes. Excellent results have been obtained with the mirrors 12 and 13 spaced apart at distances as great as 18 inches. However, to avoid vibration effects, it is best to have the mirrors spaced at a distance slightly greater than the width of the particular component being tested. Beam splitting mirror 12 may be in the form of an optical flat which is coated on its inner surface with a highly reflective material so that it is partially reflective and partially transmissive. By using a relatively dense reflective coating, such as about 80% reflecting, the interference patterns produced will have greatly enhanced contrast and sharpness. End mirror 13 may be in the form of a front surface totally reflecting mirror. Insofar as this mirror 13 is not used in transmission, any type of suitable material can be used. However, it should be sufficiently thick and rigid so that it will hold its shape to a high precision. In any event, it should be noted that end mirror 13 can, if desired, be made structurally identical to the beam splitting mirror 12.

The space between the two mirrors 12 and 13 is essentially a resonant cavity.

In order to eliminate thermal effects and air currents, the two mirrors 12 and 13 are preferably enclosed within an insulated airtight housing 14 which may be formed from any suitable material.

Positioned in optical alignment with mirrors 12 and 13 and lying in a plane parallel therewith is a collimating lens 15. In order to eliminate background interference from the light source, the collimating lens 15 is preferably a single aspheric element. The collimating lens 15 is arranged so as to receive a point source of monochromatic coherent light and transmit a beam of the same in the direction of the beam splitter 12 at normal incidence. This point source of light is derived from a beam of monochromatic coherent light emitted from a laser 16. The laser 16 is positioned in the direction of a planar reflecting mirror 17. By reflecting the beam of light off of mirror 17 the spatial frequency of the light is improved. Light from the planar reflecting mirror 17 is then reflected onto another reflecting mirror 18 which is located in the focal plane of lens 15. Reflecting mirror 18 which is in the form of an aluminized glass ball receives the beam of light from the mirror 17 and reflects a point source of collimated coherent light toward a reflecting surface 19 which in turn reflects the light into the collimating lens 15.

Reflecting surface 19 which may be in the form of an ordinary planar mirror enfolds the beam of light from mirror 17 to the collimating lens 15 and enables the laser 16 to be physically located near the housing 14 so that adjustments can be easily made.

The housing 14 is also provided with a track system 29 or other suitable means for loading and sliding the test piece into its proper position. Accordingly, the test piece which is an optical flat 11 is preferably mounted on a carriage (not shown).

The laser 16 is a continuous wave gas laser operable at 6328 angstroms. However, other types of lasers operable at other wavelengths can also be used. A reflecting mirror 18 need not be posiitoned on the optical axis of lens 15, however, it must be located in the focal plane of the lens 15.

Accordingly, the mirror 18 is positioned slightly off axis and a camera 20 positioned at the return focal point for recording the interference patterns thus formed.

The invention can also be utilized in testing other types of optically transmissive elements such as prisms. An arrangement of the mirrors for testing a prism is shown in FIG. 2.

Referring now to FIG. 2, a collimating lens 21, a beam splitter 22 and an end mirror 23 are arranged for testing an optical prism 24. Lens 21, beam splitter 22 and end mirror 23 correspond structurally to lens 15, beam splitter 12 and end mirror 13 respectively in the FIG. 1 embodiment. The remaining portions of the apparatus of this embodiment are substantially identical to the FIG. 1 embodiment.

In FIG. 3 there is shown an embodiment of the invention for use in testing an optically reflective surface such as a planar mirror 31. In the FIG. 3 embodiment the beam splitter 32 and end mirror 33 correspond structurally to the beam splitter 12 and end mirror 13 of the FIG. 1 embodiment. However as can be seen, the mirrors 32 and 33 are positioned obliquely with respect to each other as opposed to the parallel arrangement in FIG. 1. A collimating lens 34 which is structurally the same as collimating lens 15 in the FIG. 1 embodiment is positioned so as to transmit light through the beam splitter 32 at normal incidence. The remaining portions of the apparatus of this embodiment are substantially identical to the FIG. 1 embodiment. It should be noted that by means of this oblique arrangement of the beam splitter 32 and the end mirror 33 it is possible to test reflective surfaces (such as mirror 31) which are substantially greater in size than the beam splitter 32 and the end mirror 33 and is particularly useful in testing mirror surfaces that are not easily accessible.

Other types of optical elements can also be tested by means of this invention. For example, by replacing the end mirror 13 with a parabolic mirror the invention can be used in testing concave parabolic surfaces. By replacing end mirror 13 with a spherical mirror the invention can be used in testing various types of lens systems.

By testing optical elements by means of multiple wave fringes, it is possible to obtain a much higher order of precision than has hitherto been obtainable by means of separate beam interferometry.

It is to be understood that other embodiments and many alterations and modifications may be made without departing from the spirit and scope of the invention as set forth in the appended claims.

What is claimed is:

1. Apparatus for testing an optical element by multiple reflection interferometry comprising:
    (a) means for producing a collimated coherent beam of light of preselected cross-sectional diameter along a path defining an optical axis, said means including a laser for emitting a collimated coherent beam of light, a reflecting sphere disposed along the beam path for converting the collimated coherent beam of light into a diverging coherent beam of light and a lens for converting the diverging coherent beam of light into a collimated coherent beam of light of the preselected cross-sectional diameter;
    (b) a beamsplitting mirror disposed along the beam path in a plane normal to the optical axis for reflecting part of the beam and transmitting part of the beam;
    (c) means located behind the beamsplitting mirror along the optical axis for supporting the optical element being tested; and
    (d) a totally reflecting mirror positioned to receive the part of the light beam transmitted by the beamsplitting mirror on emerging after impinging on the optical element and to reflect the emerging beam back on axis so as to impinge on said optical element and pass back through the beamsplitting mirror where it combines with the beam of light reflected by the beamsplitting mirror to form a multiple reflection interference fringe pattern.

2. The apparatus according to claim 1 and further including means for recording the interference fringe pattern so formed.

3. The apparatus according to claim 1 and further including a mirror for reflecting the light emerging from the reflecting sphere to the lens.

4. The apparatus according to claim 1 and wherein the beamsplitting mirror and the totally reflecting mirror are in parallel planes.

5. The invention according to claim 1 and wherein the beamsplitting mirror and the totally reflecting mirror are in perpendicular planes.

6. The invention according to claim 1 and wherein the beamsplitting mirror and the totally reflecting mirror are positioned obliquely relative to each other.

(References on following page)

References Cited

UNITED STATES PATENTS 3,335,285 8/1967 Gally et al. _____ 331—94.5 X
3,395,960 8/1968 Chang et al.

OTHER REFERENCES

O'Donnell, T. J., Abstract of application Ser. No. 531,602, published May 20, 1952, 658 O.G. 914, 88–14.

Okaya, A., "Off-Axial Mode Rejection of Ruby Laser Using Ball Mirror," IEEE Proceedings, vol. 51, July 1963, pp. 1033–1034.

JEWELL H. PEDERSEN, Primary Examiner

T. MAJOR, Assistant Examiner

U.S. Cl. X.R.

356—109